US009355514B2

(12) United States Patent
Seibert

(10) Patent No.: US 9,355,514 B2
(45) Date of Patent: May 31, 2016

(54) DEVICE FOR HANDLING VALUE NOTES

(75) Inventor: Joachim Seibert, Brilon (DE)

(73) Assignee: Wincor Nixdorf International GmbH (DE)

( * ) Notice: Subject to any disclaimer, the term of this patent is extended or adjusted under 35 U.S.C. 154(b) by 1070 days.

(21) Appl. No.: 13/498,128

(22) PCT Filed: Aug. 27, 2010

(86) PCT No.: PCT/EP2010/062530
§ 371 (c)(1),
(2), (4) Date: Mar. 30, 2012

(87) PCT Pub. No.: WO2011/036024
PCT Pub. Date: Mar. 31, 2011

(65) Prior Publication Data

US 2012/0190342 A1 Jul. 26, 2012

(30) Foreign Application Priority Data

Sep. 25, 2009 (DE) ......................... 10 2009 043 091

(51) Int. Cl.
*H04M 1/66* (2006.01)
*G07D 11/00* (2006.01)
*G07F 19/00* (2006.01)

(52) U.S. Cl.
CPC ............ *G07D 11/0063* (2013.01); *G07F 19/20* (2013.01)

(58) Field of Classification Search
CPC .... G07F 19/20; G07F 19/209; G07D 11/0063
USPC ........................................... 455/411; 370/338
See application file for complete search history.

(56) References Cited

U.S. PATENT DOCUMENTS

| | | | |
|---|---|---|---|
| 7,395,766 B2 | 7/2008 | Landwehr et al. | |
| 7,433,848 B1 | 10/2008 | Albrecht et al. | |
| 7,959,072 B1 * | 6/2011 | Jenkins ............. | G06Q 20/1085 235/375 |
| 2003/0074106 A1 | 4/2003 | Butler | |
| 2003/0074194 A1 | 4/2003 | Finnegan | |
| 2004/0046015 A1 | 3/2004 | Skinner | |

(Continued)

FOREIGN PATENT DOCUMENTS

| | | |
|---|---|---|
| DE | 19932149 A1 | 1/2001 |
| DE | 20001117 U1 | 6/2001 |

(Continued)

OTHER PUBLICATIONS

International Search Report (in English) and Written Opinion of the International Searching Authority (in German) for PCT/EP2010/062530, mailed Jan. 21, 2011; ISA/EP.

(Continued)

*Primary Examiner* — Marcos Batista
(74) *Attorney, Agent, or Firm* — Harness, Dickey & Pierce, P.L.C.

(57) ABSTRACT

The invention relates to a device (10, 50) for handling notes of value, which comprises a radio unit (20) for sending data from the device (10, 50) to a service unit (34) via mobile radio (36). Further, the device (10, 50) has an authentication data memory (28) in which authentication data for the unambiguous authentication of the device (10, 50) by the service unit (34) are stored. The radio unit (20) transmits the authentication data and maintenance data stored in a maintenance data memory (30) to the service unit (34) via mobile radio (36).

16 Claims, 2 Drawing Sheets

(56) References Cited

U.S. PATENT DOCUMENTS

| | | | |
|---|---|---|---|
| 2004/0133659 | A1 | 7/2004 | Lacey et al. |
| 2008/0061127 | A1 | 3/2008 | Brexel |
| 2008/0102680 | A1 * | 5/2008 | Chang .................. G06K 7/0069 439/326 |
| 2009/0265276 | A1 | 10/2009 | Jordan |
| 2010/0012718 | A1 * | 1/2010 | Griswold ................ G07F 19/20 235/379 |
| 2010/0117844 | A1 | 5/2010 | Brexel et al. |
| 2010/0146264 | A1 | 6/2010 | Blume et al. |
| 2010/0213023 | A1 | 8/2010 | Freitag et al. |
| 2010/0310069 | A1 | 12/2010 | Krummel et al. |
| 2011/0056415 | A1 | 3/2011 | Moog et al. |
| 2011/0101013 | A1 | 5/2011 | Berendes |
| 2011/0181416 | A1 | 7/2011 | Dietz et al. |
| 2012/0032391 | A1 | 2/2012 | Holland-Letz et al. |

FOREIGN PATENT DOCUMENTS

| | | | |
|---|---|---|---|
| DE | 10123384 | A1 | 11/2002 |
| DE | 102004 061467 | A1 | 6/2006 |
| DE | 102008019228 | A1 | 10/2009 |
| EP | 0712099 | A1 | 5/1996 |
| EP | 0986033 | A2 | 3/2000 |
| WO | WO-01/54084 | A1 | 7/2001 |
| WO | WO-2007/036915 | A1 | 4/2007 |

OTHER PUBLICATIONS

International Preliminary Report on Patentability (Chapter I of the Patent Cooperation Treaty) in English for PCT/EP2010/062530, issued Apr. 3, 2012.

* cited by examiner

DEVICE FOR HANDLING VALUE NOTES

CROSS-REFERENCE TO RELATED APPLICATIONS

This application is a National Stage of International Application No. PCT/EP2010/062530, filed Aug. 27, 2010, and published in German as WO/2011/036024 on Mar. 31, 2011. This application claims the benefit and priority of German Application No. 10 2009 043 091.1, filed Sep. 25, 2009. The entire disclosures of the above applications are incorporated herein by reference.

BACKGROUND

This section provides background information related to the present disclosure which is not necessarily prior art.

1. Technical Field

The invention relates to a device for handling notes of value. The device comprises a maintenance data memory in which maintenance data are stored.

2. Discussion

The device is in particular an automated teller machine, an automatic cash register system or an automatic cash safe. Automated teller machines, automatic cash register systems and/or automatic cash safes have to be maintained regularly to minimize downtimes and to increase the availability for a user of the device. Maintenance is usually carried out by the operator of the automated teller machine, the automatic cash register system or the automatic cash safe in that a service employee in charge reads out the maintenance data from the maintenance data memory on site and, based on the information contained in the maintenance data, in particular messages about malfunctions, information from fault storages and/or actual values of settable parameters, removes occurred malfunctions and/or prevents malfunctions by presetting parameters to be preset. The reading-out and the maintenance of the device on site has the disadvantage that this is complex, and thus high costs are incurred for the operator of the automated teller machine.

The automated teller machines, automatic cash safes and/or automatic cash register systems are usually integrated into a computer network of the operator, with which a large number of automated teller machines, automatic cash register systems and/or automatic cash safes are connected and via which the operator can read out the maintenance data. Thus, the operator indeed no longer has to read out the maintenance data on site but nevertheless the maintenance of the automated teller machines, automatic cash safes and/or automatic cash register systems means additional, not inconsiderable expenses for the operator so that many operators wish to outsource the maintenance of their automated teller machines, automated cash register systems and/or automatic cash safes to a service provider specialized thereon.

To guarantee an effective maintenance of the automated teller machines, automatic cash safes and/or automatic cash register systems, the service provider must have access to the maintenance data. One possibility for this is to transmit the maintenance data to the service provider by e-mail, facsimile or phone at regular time intervals and/or upon the occurrence of malfunctions. This has the disadvantage that, on the one hand, this means extra expenses for the operator, on the other hand, that the service provider only receives the maintenance data at the agreed points in time or when a malfunction has already occurred so that a timely intervention before the occurrence of a malfunction cannot be guaranteed.

Another possibility is to provide the service provider with access to the computer network of the operator so that the service provider has access to the maintenance data at any time and when the actual values deviate from parameters, the service provider can adapt these parameters in time so that no malfunction occurs. What is problematic here is that via the computer networks of the operators, in particular in the case of banks, access to a large number of confidential data to which the service provider must not have any access is possible. One possibility of preventing this is the use of complex firewall systems by which it is guaranteed that the service provider is only given access to the maintenance data. This has the disadvantage that the use of such firewall systems incurs high costs for the operator. The service providers are usually not only in charge of the automated teller machines, the automatic cash register systems and/or automatic cash safes of one operator but of a plurality of operators. The use of firewall systems therefore has the disadvantage for the service provider that for each operator the service provider has to adapt to another network structure, as a result whereof high expenses and high costs are incurred for the service provider.

From the non-published document DE 10 2008 019 228 a self-service terminal is known which comprises a control unit for processing operating data and a transmission unit for the operating data transfer to a service unit. The self-service terminal is in particular an information machine, a sales machine or an automated teller machine.

SUMMARY OF THE INVENTION

It is an object of the invention to specify a device for handling notes of value, which enables a remote maintenance of the device without access to a computer network of the operator being required for the remote maintenance.

By providing a radio unit for sending data from the device to a service unit of the service provider via mobile radio and by transmitting the maintenance data to the service unit via mobile radio, the maintenance data can be transmitted to the service unit at any time without the service unit requiring access to the computer network of the operator. In this way, a remote maintenance of the device is realized in an easy manner and the security of the computer network of the operator is increased. As the maintenance data of the service unit can be transmitted at any time, the service unit can react on occurring malfunctions immediately and/or prevent malfunctions by changing pre-settable parameters.

By providing an authentication data memory in the device, in which authentication data for the unambiguous authentication of the device by the service unit are stored, it is guaranteed that the device can be unambiguously identified and authenticated by the service unit. Further, this increases the security of the data transmission.

The identification of the device can, for example, take place by means of a device-individual number. The authentication of the device at the service unit, for example, takes place in that, in addition to the device-individual number, a PIN and/or a password, preferably a one-time password are transmitted.

The maintenance data in particular comprise information from fault storages of the device, logging files, information on a malfunction, desired values of presettable parameters and/or current actual values of parameters. The maintenance data are in particular determined by means of at least one sensor for monitoring the device. By changing the setting values of the presettable parameters an occurred malfunction can be removed or, respectively, prevented when it is noticed in time that the actual values deviate from the desired values, and the corresponding setting values are again set such that a malfunction is prevented.

The device in particular comprises a subscriber identity module (SIM) with a memory area in which the maintenance data and/or the authentication data are stored. The SIM in particular comprises the authentication data memory and the maintenance data memory. The use of a SIM is advantageous since the SIM is required anyway for the establishment of the radio connection between the radio unit of the device and the service unit. By storing the authentication data and the maintenance data in a memory area of the SIM, additional memory elements are saved.

By default, authentication data which are required for the authentication of the SIM card at the mobile radio service provider to log into the mobile radio network are stored on the SIM. In a preferred embodiment of the invention, these authentication data are also used for the authentication of the SIM, and thus of the device, at the service unit. Thus, further authentication data are not required. Alternatively, in a memory area of the SIM also other authentication data for the authentication at the service unit can be stored which differ from the authentication data stored for the authentication at the mobile radio service provider.

It is advantageous when a telephone number is unambiguously assigned to the device by means of the SIM. This telephone number can in particular be used for the identification of the device by the service unit. In this case, the authentication data comprise the telephone number and further data, such as a PIN and/or a password, by which the device is authenticated by the service unit.

On the SIM, application data for encrypting and/or signing data to be sent to the service unit and/or for decrypting and/or verifying the signature of data received from the service unit can be stored. By encrypting and/or signing the data, the transmission security is increased and the use of the sent data by unauthorized people is prevented or, respectively, at least made more difficult.

The device is preferably connected to a computer network of the operator of the device via a cable-based and/or cable-free network connection, by which the operator of the device can monitor the status of the device. The operator can read out the maintenance data from the maintenance data memory via this computer network. The data transmission via the radio unit from the device to the service unit and/or from the service unit to the device takes place separately and independently of this network connection. Thus, a complete separation from the computer network of the operator is achieved so that the service unit does not have to access the computer network of the operator for the remote maintenance of the device and thus complex data protection systems, such as firewall systems, are not required. As a result thereof, expenses and costs are saved.

The radio unit transmits the authentication data and/or the maintenance data to the service unit via mobile radio in particular after it has received inquiry data from the service unit. In this way, it is achieved that the service unit can query the maintenance data at any time and can thus prevent malfunctions in time.

In a preferred embodiment of the invention, the radio unit only sends data to the service unit when it has first received authentication data for the unambiguous authentication of the service unit from the service unit. In this way, it is guaranteed that the data are exclusively transmitted to the authorized service unit and cannot be queried by arbitrary mobile radio subscribers. In a particularly preferred embodiment of the invention, the authentication data via which the radio unit authenticates the service unit comprise a telephone number of the service unit. In addition to the telephone number, in particular a PIN and/or a password are transmitted, via which the authentication takes place. Additionally or alternatively, a list of telephone numbers of the service unit can be stored in the radio unit, and the radio unit can only accept calls from these telephone numbers. Further, for the authentication of the service unit also the authentication data can be used that are needed by the service unit to log in and to authenticate itself at the mobile radio service provider. For this, the service unit preferably likewise comprises a SIM.

For transmitting the inquiry data, the service unit preferably calls the telephone number of the device. The radio unit of the device transmits the maintenance data to the service unit after the service unit has been authenticated. In a preferred embodiment of the invention, the device interrupts the mobile radio connection established between the device and the service unit after it has received the inquiry data and calls the service unit back for transmitting the maintenance data. In this way, the security of the data transmission is increased because it is guaranteed that by means of the call back the device transmits the data only to that service unit whose telephone number is stored, for example, in a memory area of the SIM of the device.

The radio unit in particular comprises a mobile phone for sending and receiving the data. In this way, a simple and cost-efficient structure of the radio unit is achieved.

In a preferred embodiment of the invention the radio unit receives the authentication data of the service unit together with the inquiry data of the service unit. Alternatively, the radio unit can also at first receive the authentication data of the service unit and only receive the inquiry data when the service unit has been authenticated by the device.

It is likewise advantageous when the radio unit transmits the authentication data for authenticating the device by the service unit before transmitting the maintenance data. Alternatively, the authentication data of the device and the maintenance data can also be transmitted jointly to the service unit.

The radio unit transmits the authentication data and/or the maintenance data preferably at preset time intervals to the service unit. In this way, it is guaranteed that the maintenance data are regularly transmitted to the service unit so that it can react to malfunctions in time or, respectively, can prevent malfunctions in time. The time intervals and/or the level of detail of the information comprised by the maintenance data are preferably changeable and/or presettable. In this way, the time intervals and the level of detail can be adapted to the individual requirements of the respective device. In particular, in the case of devices in which a large number of notes of value are handled per time unit, shorter time intervals and/or a higher level of detail can be preset than in devices by which only a few notes of value are handled in the same time unit. The setting of the time intervals and/or of the level of detail in particular takes place dependent on a settable service level.

Additionally or alternatively to the transmission of the maintenance data at preset time intervals or at preset points in time the radio unit can also send the authentication data and/or the maintenance data to the service unit when at least one of the information contained in the maintenance data has changed. The radio unit in particular sends the maintenance data to the service unit when there is a malfunction of the device. In this way, it is achieved that the service unit is informed about a malfunction immediately after the occurrence of the malfunction, and thus countermeasures for the removal of the malfunction can be taken immediately. This reduces the downtimes of the device, and the availability of the device for the user or, respectively, the customer is increased.

Further, the device can comprise a control unit which compares the actual values of the settable parameters contained in the maintenance data with limit values. The radio unit sends the maintenance data to the service unit when the comparison of the actual values with the limit values results in that at least one of the actual values exceeds an upper limit value or falls below a lower limit value. In this way, it is achieved that the service unit is informed before a malfunction of the device occurs so that the service unit can counteract the occurrence of this malfunction in time and downtimes of the device are prevented or, respectively, minimized. The limit values are in particular preset such that the service unit has sufficient time to react to the changed parameters and to take countermeasures in time so that no malfunction occurs.

It is advantageous when the radio unit receives data, sent from the service unit via mobile radio, with at least one setting value to be preset and/or at least one instruction to be executed. By setting the transmitted setting value to be preset and/or by executing the transmitted instruction to be executed an occurred malfunction is removed or, respectively, the occurrence of malfunctions is prevented. Thus, malfunctions can be removed or, respectively, a malfunction can be prevented without an employee of the service provider in charge of the maintenance having to drive to the installation site of the device to change the setting values to be preset or, respectively, to enter the instructions directly into the device.

Alternatively, the remote maintenance can also only take place unidirectionally, i.e. the device exclusively transmits the maintenance data to the service unit, whereas the removal of malfunctions and/or the change of setting values takes place on site at the device by a service employee. In this case, it is sufficient when the radio unit is designed such that it can send data via mobile radio to the service unit but receives and/or further processes no data from the service unit.

The setting values to be preset and transmitted from the service unit and/or the instructions to be executed and transmitted from the service unit are in particular only executed by the device when the service unit has first transmitted authentication data for the unambiguous authentication of the service unit to the device. In this way, it is achieved that the setting values are only changed or, respectively, the instructions are only executed when they were sent by an authorized service unit. In this way, an abuse of the remote maintenance option via the mobile radio network is prevented.

The service unit is in particular integrated into a service center of a service provider in charge of the maintenance of the device that is remote from the device. The service provider can in particular be the manufacturer of the device. The manufacturer can thus offer the device with a so-called remote maintenance option by which he can guarantee a higher availability of the device and less downtimes of the device. In this way, the manufacturer achieves a closer bond with the operator of the device and generates additional earnings via the remote maintenance. Alternatively, the service provider need not be the manufacturer but can be a service provider specialized in the maintenance of devices for handling notes of value.

In a preferred embodiment of the invention the device comprises a safe for accommodating cash cassettes in which at least one cash cassette is accommodated. The cash cassette comprises an authentication data memory in which authentication data for the unambiguous authentication of the cash cassette by a service unit are stored. The radio unit transmits these authentication data and stock data with information on the current stock of notes of value in the cash cassette to a service unit via mobile radio. In this way, it is achieved that the stock data can be transmitted to a service unit without the service unit having to have access to the computer network of the operator. By transmitting the stock of the cash cassette to the service unit it is guaranteed that the service provider can empty or, respectively, fill the cash cassette in time before the cash cassette is completely filled or, respectively, completely emptied. In this way, an effective stock management of the cash cassettes accommodated in the device is achieved. In particular, it is achieved in this way that the service provider can query the current stock of the cash cassette at any time and thus can empty and fill the cash cassettes in time. Such an effective stock management is in particular used for realizing a closed money circuit, a so-called cash cycle management of the second order, in which cash cassettes are directly exchanged between automated teller machines, automatic cash register systems and/or automatic cash safes without these having to be emptied and re-filled in a so-called cash center. The cash cassettes preferably comprise one SIM each, on which the authentication data are stored. Via the SIM a telephone number which the service unit can call to query the stock data is unambiguously assigned to each cash cassette.

The service unit for maintenance of the device and the service unit for stock management of the cash cassettes can be identical. Alternatively, the service units can also be different service units.

In an alternative embodiment of the invention, the device comprises a safe for accommodating cash cassettes, in which at least one cash cassette is accommodated which comprises a memory element and a radio unit for sending data from the cash cassette to a service unit via mobile radio and/or for receiving data from the service unit. In the memory element of the cash cassette authentication data for the unambiguous authentication of the cash cassette by the service unit are stored. The radio unit transmits the authentication data stored in the memory element of the cash cassette and stock data with information on the current stock of notes of value in the cash cassette to the service unit via mobile radio. By additionally providing a mobile radio unit for each cash cassette, it is achieved that the cash cassettes can send the stock data to the service unit also independently of whether they are accommodated in the device or not.

Further, it is advantageous when the device comprises a control unit for controlling the device, which executes program data of a computer program. The control unit reads out the authentication data of the device and generates an unambiguous reference value. The radio unit transmits reference data for generating a device-individual license key to a license management unit, the reference data comprising the reference value. The radio unit receives data comprising the license key from the license management unit and enables at least one function module of the computer program dependent on the license key. In this way, an easy licensing method for the computer program to be executed by the control unit is achieved. The license granting and the license management can take place via the mobile radio connection. By transmitting the reference data and the license key via the mobile radio connection no access to the computer network of the operator into which the device is integrated is required so that security measures against accesses of the licensor to data for which he has not authorization are not required either. Further, the licensor can provide updates for the computer program via the mobile radio connection between the license management unit and the radio unit, and the updates can, for example, be installed and serviced by means of remote maintenance.

The transmission of the data between the device and the license management unit and/or the transmission of the data between the device and the service unit for the stock management can take place in the same manner as previously described for the transmission of the data between the device and the service unit for the maintenance of the device. In particular, the data transmission between the device and the license management unit and/or the data transmission between the device or, respectively, the cash cassettes and the service unit for stock management can be developed in the same manner as described in the dependent claims for the data transmission between the device and the service unit for maintenance of the device.

BRIEF DESCRIPTION OF THE DRAWINGS

The drawings described herein are for illustrative purposes only of selected embodiments and not all possible implementations, and are not intended to limit the scope of the present disclosure.

Further features and advantages of the invention result from the following description which in connection with the enclosed Figures explains the invention in more detail with reference to embodiments.

Corresponding reference numerals indicate corresponding parts throughout the several views of the drawings.

DETAILED DESCRIPTION OF THE PREFERRED EMBODIMENTS

Example embodiments will now be described more fully with reference to the accompanying drawings.

Figure 1:
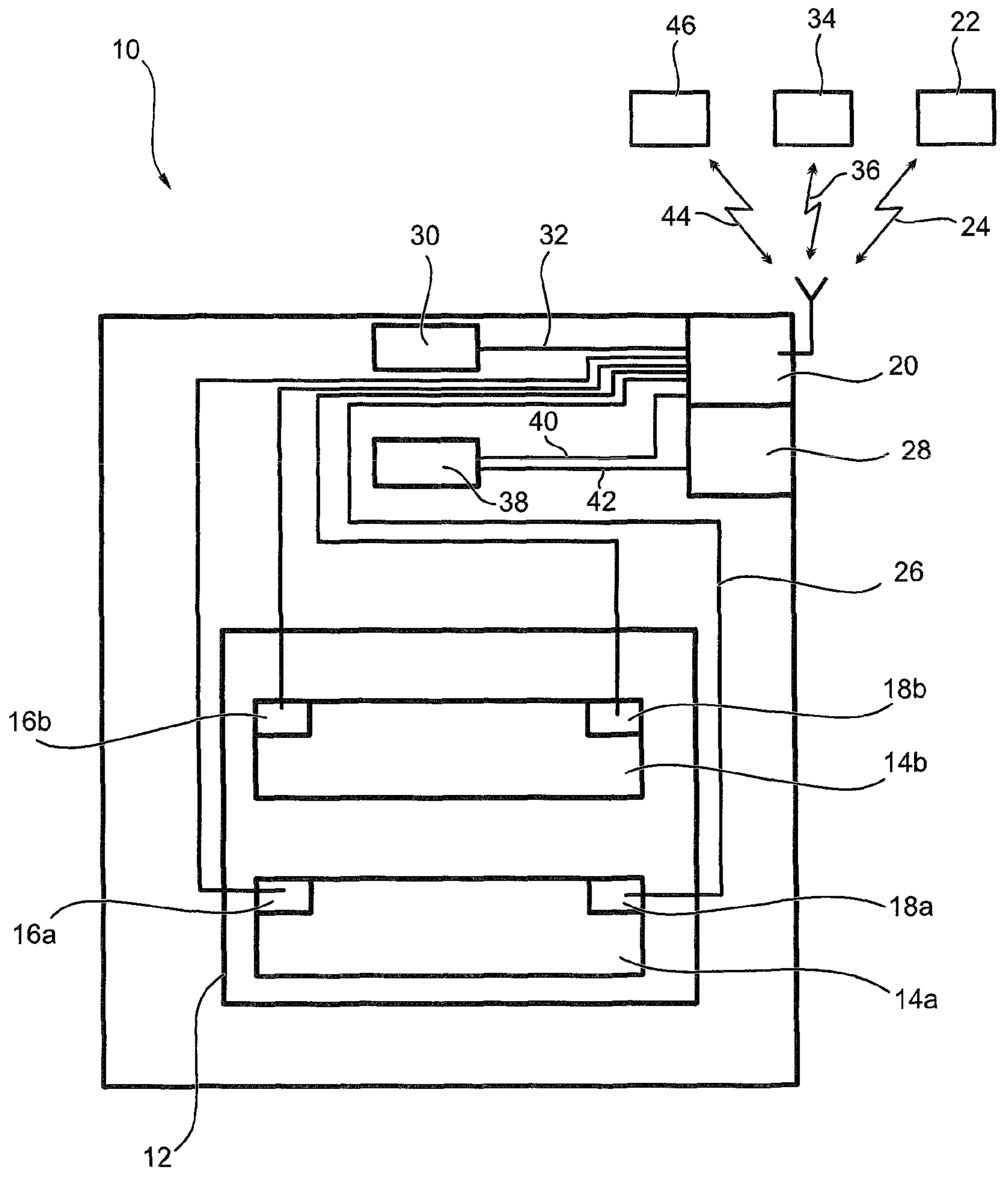
FIG. 1 shows a schematic illustration of a device for handling notes of value according to a first embodiment of the invention.

In FIG. 1, a schematic illustration of a device 10 for handling notes of value according to a first embodiment of the invention is shown. In this embodiment, the device 10 is an automated teller machine. Alternatively, the device 10 can also be an automatic cash register system or an automatic cash safe.

The automated teller machine 10 comprises a safe 12 in which two cash cassettes 14*a*, 14*b* are accommodated. By means of the safe 12, the cash cassettes 14*a*, 14*b* are protected against unauthorized access. In an alternative embodiment, the automated teller machine 10 can also only comprise one cash cassette 14*a*, 14*b* or more than two cash cassettes 14*a*, 14*b*. The cash cassettes 14*a*, 14*b* are connected via a non-illustrated transport path to a likewise not illustrated input and output module for depositing and/or withdrawing notes of value.

The two cash cassettes 14*a*, 14*b* each comprise a stock data memory 16*a*, 16*b* and a subscriber identity module (SIM) 18*a*, 18*b*. In each stock data memory 16*a*, 16*b*, stock data with information on the current stock of notes of value in the respective cash cassette 14*a*, 14*b* are stored. Preferably, the serial number, the order, the denomination or the currency of all notes of value held in the respective cash cassette 14*a*, 14*b* are stored in the stock data memory 16*a*, 16*b*, as a result whereof a closed money circuit, a so-called cash cycle management of the second order, is made possible because the current stock of the cash cassettes 14*a*, 14*b* is known at any time. In this way, the cash cassettes 14*a*, 14*b* can be exchanged between different automated teller machines 10 without a revision having to be carried out first.

Further, the automatic teller machine 10 comprises a radio unit 20 for sending data to a stock service unit 22 and for receiving data from this stock service unit 22 via mobile radio. The receiving and sending of data via mobile radio is indicated by the double arrow 24. The SIMs 18*a*, 18*b* of the cash cassettes 14*a*, 14*b* each comprise a memory area in which authentication data for the unambiguous authentication of the cash cassettes 14*a*, 14*b* by the stock service unit 22 are stored. Via these authentication data, the individual cash cassettes 14*a*, 14*b* can be unambiguously identified and authenticated by the stock service unit 22. Both the SIMs 18*a*, 18*b* of the cash cassettes 14*a*, 14*b* and the stock data memories 16*a*, 16*b* are connected to the radio unit 20. The SIMs 18*a*, 18*b* and the stock data memories 16*a*, 16*b* are preferably connected to the radio unit 20 via data cables for data transmission. One of these data cables is exemplarily identified with the reference sign 26. Alternatively, the SIMs 18*a*, 18*b* and/or the stock data memories 16*a*, 16*b* can also be connected to the radio unit 20 via a cable-free data connection.

The radio unit 20 sends stock data with information on the current stock of notes of value in the cash cassettes 14*a*, 14*b* and the authentication data stored in the SIMs 18*a*, 18*b* via mobile radio 24 to the stock service unit 22. In this way, the stock service unit can monitor the stock of notes of value in the cash cassettes 14*a*, 14*b* at any time. When the stock in a cash cassette 14*a*, 14*b* exceeds an upper limit value or when the stock in a cash cassette 14*a*, 14*b* falls below a lower limit value, then the stock service unit 22 causes that the respective cash cassette 14*a*, 14*b* is filled with notes of value or, respectively, emptied. In this way, it is guaranteed that the cash cassettes 14*a*, 14*b* are emptied or, respectively, filled in time so that there will be no downtimes of the automated teller machine 10 and a customer using the automated teller machine 10 is paid out a desired amount of money at any time and/or can deposit a desired amount of money at any time.

The stock service unit 22 is in particular integrated into a service center, preferably a data processing system, of a service company in charge of the stock management of the automated teller machine 10. The service company is in particular a valuable transport company which is in charge of a plurality of automated teller machines 10, automatic cash register systems and/or automatic cash safes and which distributes notes of value to be paid out from these or, respectively, notes of value deposited therein, in particular in the form of a closed money circuit, between the individual automated teller machines 10, automatic cash register systems and/or automatic cash safes and a cash center. The stock service unit 22 is in particular arranged remotely from the automated teller machine 10.

The points in time at which the stocks in the cash cassettes 14*a*, 14*b* are transmitted to the stock service unit 22 via mobile radio 24 can be fixed in different ways.

In a first embodiment, the stock data of the individual cash cassettes 14*a*, 14*b* can be transmitted to the stock service unit 22 at preset periodically recurring time intervals. Here, the SIMs 18*a*, 18*b* of the cash cassettes 14*a*, 14*b* are connected to the radio unit 20 in accordance with these time intervals so that within this time interval the stock data of the cash cassette 14*a*, 14*b* connected to the radio unit 20 can be transmitted to the stock service unit 22.

In a second embodiment, the device 10 can comprise a non-illustrated control unit which compares the current stock of notes of value in the cash cassettes 14*a*, 14*b* with the upper and the lower limit value. When the current stock in a cash cassette 14*a*, 14*b* exceeds the upper limit value or when the current stock of a cash cassette 14*a*, 14*b* falls below the lower limit value then the stock data are sent to the stock service unit 22 via the radio unit 20. Alternatively, also each cash cassette 14*a*, 14*b* can comprise a control unit which compares the current stock with the upper and the lower limit value. The upper and the lower limit value can be differently preset for each cash cassette 14*a*, 14*b*.

In a further embodiment, the stock data can be transmitted to the stock service unit 22 when the stock service unit 22 has first transmitted inquiry data to the radio unit 20 of the automated teller machine 10. For this, the SIMs 18*a*, 18*b* of the cash cassettes 14*a*, 14*b* can be alternately connected to the radio unit 20 at periodically recurring time intervals. Only within the time interval within which the respective SIM 18*a*, 18*b* is connected with the radio unit 20, the stock service unit 22 can query the stock data of the respective cash cassette 14*a*, 14*b*.

For inquiry of the stock data, the stock service unit 22 can in particular call a telephone number that is unambiguously assigned to the respective cash cassette 14*a*, 14*b* via the respective SIM 18*a*, 18*b*. Alternatively, the automated teller machine 10 can also comprise a SIM 28 via which a telephone number is unambiguously assigned to the automated teller machine 10. For each telephone number of the cash cassettes 14*a*, 14*b*, a call forwarding to the telephone number of the automated teller machine 10 is set up, preferably automatically, so that the inquiry data which were sent to a telephone number of a cash cassette 14*a*, 14*b* are forwarded to the telephone number of the automated teller machine 10 and can be received by the automated teller machine 10 at any time. The radio unit 20 then transmits the stock data of the respective cash cassette 14*a*, 14*b* to the stock service unit 22.

Alternatively, the afore-described embodiments for fixing the points in time at which the stock data are transmitted can also be combined with one another. In particular, the stock data can be transmitted at fixed points in time and can in addition be queried between the points in time by the stock service unit 22 if required.

The radio unit 20 only transmits data to the stock service unit 22 when it has first received authentication data for the unambiguous authentication of the stock service unit 22 by the stock service unit 22. In this way, it is guaranteed that the data can only be transmitted to an authorized stock service unit 22 and cannot be queried by any mobile radio subscriber.

Prior to their transmission, the data transmitted from the radio unit 20 to the stock service unit 22 are encrypted and/or signed by means of application data for encrypting and/or signing data that are stored on the SIM 28 of the automated teller machine 10 or the respective SIM 18*a*, 18*b* of the respective cash cassette 14*a*, 14*b*. In this way, a secure transmission is achieved so that the data cannot be used and/or manipulated by unauthorized mobile radio subscribers.

By authenticating the cash cassette 14*a*, 14*b* at the stock service unit 22 and by authenticating the stock service unit 22 at the automated teller machine 10, a two-way-authentication is achieved, as a result whereof it is guaranteed that the data are only transmitted between authorized units.

The stock data and the authentication data are transmitted successively, the authentication data being transmitted first and then the stock data being transmitted. Alternatively, the authentication data and the stock data can also be transmitted jointly. As authentication data in particular those authentication data can be used which are used on the SIM 18*a*, 18*b*, 28 for the authentication of the SIM 18*a*, 18*b*, 28 at the mobile radio service provider. Thus, no further authentication data for the authentication of the cash cassettes 14*a*, 14*b* or, respectively, of the automated teller machine 10 at the stock service unit 22 have to be stored on the SIM 18*a*, 18*b*, 28.

Further, the automated teller machine 10 comprises a maintenance memory 30 which is connected to the radio unit 20 via a data cable 32. In the maintenance data memory 30 maintenance data are stored. The maintenance data can in particular comprise information on malfunctions of the automated teller machine 10, data of fault storages, logging files, desired values of parameters of the automated teller machine 10 and/or actual values of parameters of the automated teller machine 10.

The SIM 28 of the automated teller machine 10 comprises a memory area in which authentication data for the unambiguous authentication of the automated teller machine 10 at a maintenance service unit 34 are stored. The radio unit 20 transmits the authentication data stored on the SIM 28 of the automated teller machine 10 and the maintenance data to the maintenance service unit 34 via mobile radio 36. The authentication of the automated teller machine 10 at the maintenance service unit 34 can take place in the same manner as previously described for the authentication of the cash cassettes 14*a*, 14*b* at the stock service unit 22. By transmitting the maintenance data via mobile radio 36 a remote maintenance of the automated teller machine 20 is made possible in an easy manner. The radio unit 20 transmits the maintenance data to the maintenance service unit 34 at preset time intervals, for example daily at midnight.

In an alternative embodiment, the maintenance data can also be transmitted to the maintenance service unit 34 when at least one piece of information contained in the maintenance data has changed, in particular when there is a malfunction of the automated teller machine 10. In this way, it is achieved that the maintenance service unit 34 is informed about the presence of a malfunction immediately after the occurrence of a malfunction so that the malfunction can be removed as soon as possible. For removal of the malfunction, the maintenance service unit 34 sends via mobile radio 36 data with at least one setting value to be preset and/or at least one instruction to be executed, via which the present malfunction is to be removed. Alternatively, the radio connection can also only be established unidirectionally between the radio unit 20 and the maintenance service unit 34, i.e. the radio unit 20 can indeed send data to the maintenance service unit 34 but cannot receive any data from the maintenance service unit 34. In this case, malfunctions have to be removed on site by an employee of the maintenance service company. The maintenance service unit 34 is in particular integrated into a data processing system of a maintenance service company. The maintenance service unit 34 and the stock service unit 22 can be identical or can be separate units.

The data transmitted between the radio unit 20 and the maintenance unit 34 are, as already previously described for the data transmitted between the radio unit 20 and the stock service unit 22, encrypted and/or signed. The radio unit 20 preferably only transmits data to the maintenance service unit 34 and/or only sets the transmitted setting values or, respectively, only executes the received instructions when it has first received authentication data for the unambiguous authentication of the maintenance service unit 34 from the maintenance service unit 34.

Further, the automated teller machine 10 comprises a control unit 38 which is connected to the radio unit 20 and the SIM 28 of the automated teller machine 10 via data cables 40, 42. The control unit 38 executes program data of a computer program for the control of the automated teller machine 10. For the licensing of this computer program or of modules of the computer program the control unit 38 reads out the authentication data which are stored in the SIM 28 and generates a reference value dependent on these authentication data. The radio unit 20 then sends via mobile radio 44 reference data which comprise the reference value to a license management unit 46. The license management unit 46 generates dependent on the reference data and the function modules booked by the licensee, in particular the operator of the automated teller machine 10, a license key and sends data comprising the license key via mobile radio 44 to the radio unit 20. The control unit 38 then enables the function modules of the computer program purchased by the licensee dependent on the license key. The reference data in particular comprise the reference value, information about the licensee and/or order information.

The license management unit is in particular integrated into a data processing system of the licensor. The licensor is in particular the manufacturer of the computer program whose program data are executed by the control unit 38.

In this way, an easy licensing method for licensing the computer program is achieved. In particular, the licensing of the computer program can take place without data having to be manually installed on the automated teller machine 10. The computer program with all its function modules is in particular factory-preinstalled on the automated teller machine 10 or is completely installed upon start-up of the automated teller machine 10. The modules purchased by the licensee are then enabled by the licensing. On each automated teller machine 10, the same computer program or, dependent on which function modules have been purchased by the operator of the automated teller machine 10, a different computer program can be factory-preinstalled. This reduces the expenses. The reference data are in particular transmitted from the automated teller machine 10 to the license management unit 46 when the automated teller machine 10 is put into operation for the first time.

The data transmission between the automated teller machine 10 and the license management unit 46 only takes place when the license management unit 46 has authenticated itself at the automated teller machine 10 by sending authentication data and/or when the automated teller machine 10 has authenticated itself at the license management unit 46 by sending the authentication data stored on the SIM 28. As already described, the data transmitted between the license management unit 46 and the automated teller machine 10 are encrypted and/or signed. For this, likewise application data preferably stored in a memory area of the SIM 28 are used.

The automated teller machine 10 is in particular integrated into a computer network of the operator, into which several automated teller machines, automatic cash register systems and/or automatic cash safes are integrated and via which the operator can retrieve and/or manage current information about the automated teller machines, automatic cash register systems and/or automated cash safes at any time. By transmitting the stock data, the maintenance data and the reference data via mobile radio 24, 36, 44 to the stock service unit 22, the maintenance service unit 34 or, respectively, the license management unit 46 it is achieved that the stock service unit 22, the maintenance service unit 34 and the license management unit 46 do not require access to this computer network. In this way, data security within the computer network of the operator is increased because there is no access from outside. In particular, in this way, cost-efficient and complex firewalls can be dispensed with. On the other hand, the service units 22, 34 and the license management unit 46 need not be configured on different network structures at different operators of automated teller machines, automatic cash register systems and/or automatic cash safes.

In an alternative embodiment of the invention, the authentication data need not be stored in the respective SIM 18*a*, 18*b*, 28 but can be stored in separate authentication data memories. Further, alternatively, the stock service unit 22 and the maintenance service unit 34 can be the same service unit, in particular when the service company in charge of the stock management and the service company in charge of the maintenance are the same service company.

The maintenance of the automated teller machine 10 is in particular carried out by the manufacturer of the automated teller machine 10. The license management unit 46 is in particular integrated into a service center of the manufacturer of the computer program whose program data are executed by the control unit 38. In this case, updates of the computer program can be transmitted from the license management unit 46 via mobile radio 44 to the radio unit 20. In this way, it is achieved that the updates do not have to be installed on the automated teller machine 10 manually on site, but can be transmitted and installed cost-efficiently, quickly and easily by means of mobile radio 44. The updates in particular comprise so-called hotfixes and/or security patches.

In an alternative embodiment of the invention, also only the licensing and the maintenance of the automated teller machine 10 can be carried out via mobile radio. Likewise, alternatively, also only the stock management and the maintenance can be carried out via mobile radio.

Figure 2:
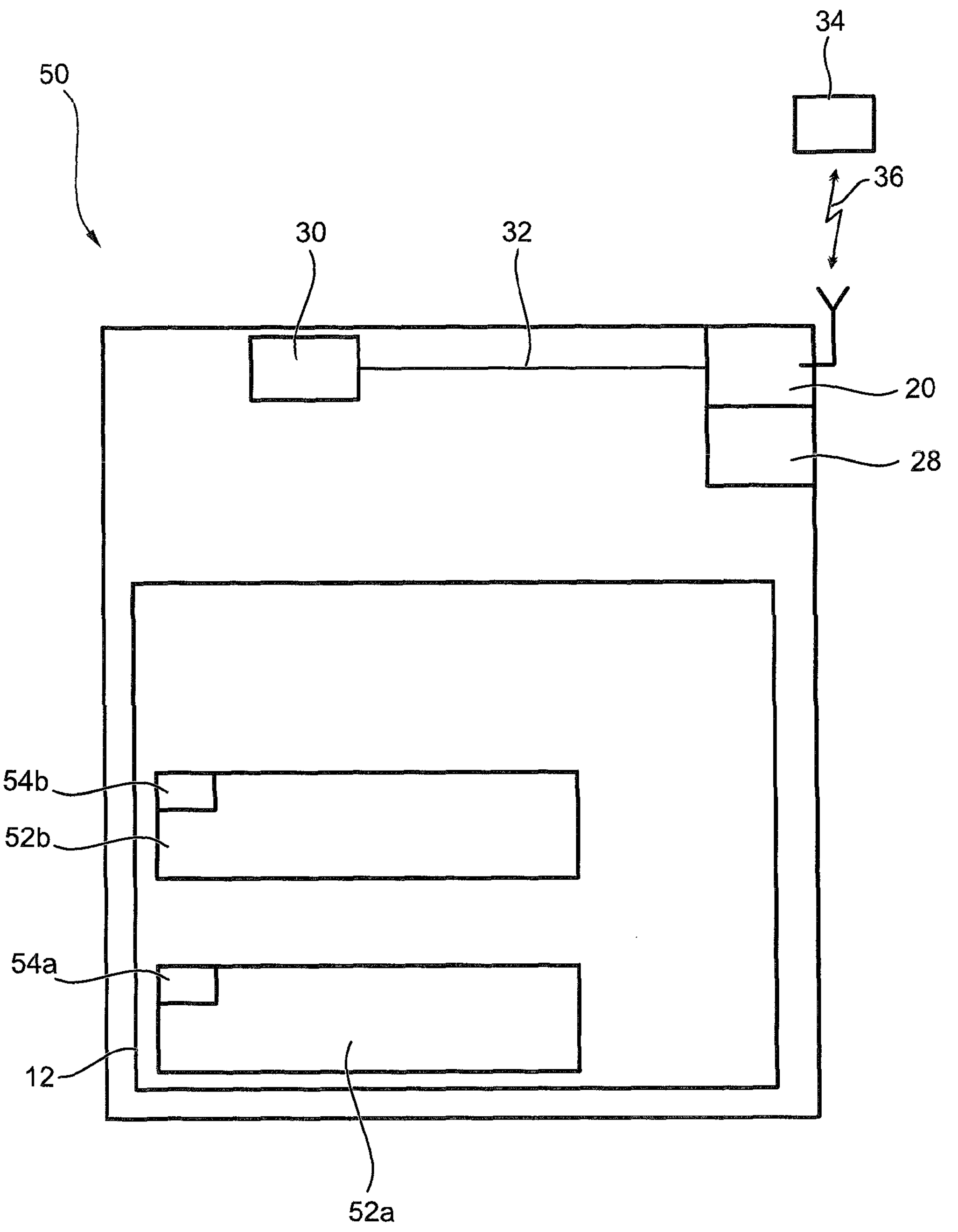
FIG. 2 shows a schematic illustration of a device for handling notes of value according to a second embodiment of the invention.

In FIG. 2, a schematic illustration of a device 50 for handling notes of value according to a second embodiment of the invention is shown. Elements having the same structure or the same function are identified with the same reference signs.

In contrast to the automated teller machine 10 shown in FIG. 1, in the device 50 according to FIG. 2, the radio unit 20 exclusively serves to transmit data between the device 50 and the maintenance service unit 34 via mobile radio 36. A licensing and/or license management via mobile radio does not take place in this embodiment. Likewise, in this embodiment, the cash cassettes 52*a*, 52*b* accommodated in the safe 12 do not have a SIM and are not connected to the radio unit 20 either. The cash cassettes 52*a*, 52*b* each have a stock data memory 54*a*, 54*b*, in each of which at least the current stock of notes of value in the respective cash cassette 52*a*, 52*b* is stored. The filling and/or emptying of the cash cassettes 52*a*, 52*b* in particular takes place at fixed points in time agreed upon between the operator of the device 50 and a service provider and/or when the operator of the device 50 requests the service provider to do so on the basis of the present stock data.

The maintenance service unit 34 is in particular integrated into a service center of the manufacturer of the device 10, 50. In this way, the manufacturer of the device 10, 50 can offer a so-called "remote maintenance option" and can guarantee the operator of the device 10, 50 a higher availability of the device 10, 50, provided that the operator signs this remote maintenance option. In this way, the manufacturer of the device 10, 50 can tie the operator closer to him and can generate additional earnings.

In contrast to the previously described embodiments, in an alternative embodiment the transmission of data via mobile radio 36 between the device 10, 50 and the maintenance service unit 34 can also only take place unidirectionally, i.e. the device 10, 50 indeed sends data by means of the radio unit 20 via mobile radio 36 to the maintenance service unit 34 but does not receive any data from the maintenance service unit 34. In this case, malfunctions at the installation site of the device 10, 50 have to be removed by a service employee of the maintenance service company. Likewise, changes of setting values of the settable parameters have to be carried out on site. The frequency of the data transmission between the device 10, 50 and the maintenance service unit 34 and/or the level of detail of the information transmitted via the maintenance data can be fixed, preferably dependent on a service level. In this way, the frequency and the level of detail of the data transmission can be adapted to the individual circumstances of the device 10, 50, in particular at the installation sites of the device 10, 50. In automated teller machines, automatic cash register systems and/or automatic cash safes 10, 50 into which and from which a large number of notes of value are deposited and withdrawn, respectively, it is useful to transmit the maintenance data at shorter time intervals or, respectively, with a higher detail accuracy than in devices 10, 50 which only handle a small number of notes of value.

The foregoing description of the embodiments has been provided for purposes of illustration and description. It is not intended to be exhaustive or to limit the invention. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the invention, and all such modifications are intended to be included within the scope of the invention.

The invention claimed is:

1. A device for handling notes of value, comprising a radio unit for sending data from the device to a service unit via mobile radio, an authentication data memory in which authentication data for the unambiguous authentication of the device by the service unit are stored, the authentication data includes at least one of a telephone number assigned to the device, a personal identification number (PIN), and a password, and a maintenance data memory in which maintenance data are stored, wherein the radio unit transmits the authentication data and the maintenance data to the service unit encrypted via mobile radio, the authentication data permits verification of the authenticity of the transmission and the maintenance data thereof.

2. The device according to claim 1, wherein the device comprises a subscriber identity module (SIM) with a memory area for storing the maintenance data and/or the authentication data.

3. The device according to claim 2, wherein a telephone number is unambiguously assigned to the device by means of the SIM.

4. The device according to claim 2, wherein application data for encrypting and/or signing data to be sent to the service unit and/or for decrypting and/or verifying the signature of data received by the service unit are stored on the SIM.

5. The device according to claim 1, wherein the device is integrated into a computer network of an operator of the device via a cable-based and/or a cable-free network connection, and in that the data transmission via the radio unit takes place separately and independently of the network connection.

6. The device according to claim 1, wherein the radio unit transmits the authentication data and the maintenance data to the service unit via mobile radio after the radio unit has received inquiry data from the service unit.

7. The device according to claim 1, wherein the radio unit only sends data to the service unit when it has received authentication data for the unambiguous authentication of the service unit from the service unit.

8. The device according to claim 1, wherein the radio unit comprises a mobile phone for sending and receiving mobile radio.

9. The device according to claim 1, wherein the radio unit sends the authentication data and/or the maintenance data at preset time intervals to the service unit.

10. The device according to claim 1, wherein the radio unit sends the maintenance data to the service unit when at least one piece of information contained in the maintenance data has changed.

11. The device according to claim 1, wherein the radio unit receives data, sent from the service unit via mobile radio, with at least one setting value to be preset and/or at least one instruction to be executed.

12. The device according to claim 1, wherein the service unit is integrated into a service center of a service provider in charge of the maintenance of the device that is remote from the device.

13. The device according to claim 1, wherein the device comprises a safe for accommodating cash cassettes, in that in the safe at least one cash cassette is accommodated which comprises an authentication data memory in which authentication data for the unambiguous authentication of the cash cassette by a service unit are stored, in that stock data with information on the current stock of notes of value in the cash cassette can be determined, and in that the radio unit transmits the authentication data and the stock data to the service unit via mobile radio.

14. The device according to claim 1, wherein the device comprises a safe for accommodating cash cassettes, in that in the safe at least one cash cassette is accommodated which comprises a memory element and a radio unit for sending data from the cash cassette to a service unit via mobile radio and/or for receiving data sent from the service unit, in that in the memory element of the cash cassette authentication data for the unambiguous authentication of the cash cassette by the service unit are stored, and in that the radio unit of the cash cassette transmits the authentication data stored in the memory element of the cash cassette and stock data with information on the current stock of notes of value in the cash cassette to the service unit via mobile radio.

15. The device according to claim 1, wherein the device comprises a control unit for controlling the device, in that the control unit executes program data of a computer program, in that the control unit of the device reads out the authentication data and generates an unambiguous reference value dependent on these authentication data, in that the radio unit of the device transmits reference data for generating a device-individual license key to a license management unit via mobile radio, in that the reference data comprise the reference value, in that the radio unit of the device receives data comprising the license key from the license management unit, and in that the control unit enables at least one function module of the computer program dependent on the license key.

16. A device for handling notes of value, comprising a radio unit for sending data from the device to a service unit via mobile radio, an authentication data memory in which authentication data for the unambiguous authentication of the device by the service unit are stored, and a maintenance data memory in which maintenance data are stored, wherein the radio unit transmits the authentication data and the maintenance data to the service unit via mobile radio, wherein the device comprises a control unit for controlling the device, in that the control unit executes program data of a computer program, in that the control unit of the device reads out the authentication data and generates an unambiguous reference value dependent on these authentication data, in that the radio unit of the device transmits reference data for generating a device-individual license key to a license management unit via mobile radio, in that the reference data comprise the reference value, in that the radio unit of the device receives data comprising the license key from the license management unit, and in that the control unit enables at least one function module of the computer program dependent on the license key.

* * * * *